United States Patent
Schätzler

(10) Patent No.: US 6,520,570 B2
(45) Date of Patent: Feb. 18, 2003

(54) MOTOR VEHICLE ROOF MODULE

(75) Inventor: Walter Schätzler, Starnberg (DE)

(73) Assignee: Webasto Vehicle Systems International GmbH, Stockdorf (DE)

(*) Notice: Subject to any disclaimer, the term of this patent is extended or adjusted under 35 U.S.C. 154(b) by 0 days.

(21) Appl. No.: 09/899,524

(22) Filed: Jul. 6, 2001

(65) Prior Publication Data
US 2002/0024239 A1 Feb. 28, 2002

(30) Foreign Application Priority Data
Jul. 6, 2000 (DE) .......................... 100 46 674

(51) Int. Cl.$^7$ ................................ B60J 7/00
(52) U.S. Cl. ............... 296/216.01; 296/216.06; 296/223
(58) Field of Search .............. 296/216.01, 216.06, 296/216.07, 223

(56) References Cited

U.S. PATENT DOCUMENTS 4,243,261 A * 1/1981 Trenkler ................. 296/223 X
4,978,165 A * 12/1990 Schreiter et al. ........ 296/223 X

FOREIGN PATENT DOCUMENTS

| DE | 2309317 | * 10/1973 | ............... 296/223 |
| DE | 30 02 246 | 7/1981 | |
| DE | 4313687 | * 11/1994 | ............... 296/223 |
| DE | 198 51 366 | 5/1999 | |
| DE | 299 12 148 | 11/1999 | |
| EP | 1 048 553 | 11/2000 | |
| GB | 2184404 | * 6/1987 | ............ 296/216.01 |

* cited by examiner

Primary Examiner—Dennis H. Pedder
(74) Attorney, Agent, or Firm—Nixon Peabody LLP; David S. Safran

(57) ABSTRACT

A motor vehicle roof module for attachment to the roof frame area of a motor vehicle body, with at least one cover (11) for selectively closing and exposing a roof opening in the roof module (11), with an electric motor drive (25, 26) for actuating the cover (11), and with a front apron (13) that forms a hollow profile component of a mounting frame of the roof module (10), and in which the electric motor drive (25, 26) is held at least partially within the apron (13).

11 Claims, 1 Drawing Sheet

MOTOR VEHICLE ROOF MODULE

BACKGROUND OF THE INVENTION

1. Field of the Invention

The invention relates to a motor vehicle roof module for attachment to the roof frame area of a motor vehicle body, with at least one cover for selectively closing and exposing a roof opening in the roof module, with an electric motor drive for actuating the cover, and with a front apron, hollow profile component of a mounting frame which is formed on the roof module.

2. Description of Related Art

In a motor vehicle roof module of the initially mentioned type, the electric motor drive is located between the rear edge of the apron and the front edge of the cover. As a result of this mounting site for the electric motor drive, the cover with its front edge comes to rest relatively far to the rear. Moreover, the area between the front edge of the cover and the rear edge of the apron is covered by the electric motor drive, so that this area of the roof is not available for looking out from the passenger compartment.

Published German Patent Application DE 30 02 246 A1 discloses, for example, not in conjunction with motor vehicle roof modules, but in connection with motor vehicle roofs which are permanently integrated with the motor vehicle body, placing the electric motor drive in the area of the apron, on its bottom. One suitable roof module is known from published European Patent Application EP 1 048 553 A2, the contents of which are herewith expressly incorporated into the disclosure content of this application.

SUMMARY OF THE INVENTION

In view of the above mentioned prior art, a primary object of the present invention is to devise a motor vehicle roof module of the initially mentioned type which ensures the arrangement of the cover directly in the area of the rear edge of the apron and/or unobstructed vision between the rear edge of the apron and the front edge of the cover.

This object is achieved by the electric motor drive being held at least partially within the apron. Advantageously, according to a preferred embodiment of the invention the motor drive is held completely in the apron, although it is also possible for the electric motor drive to project from the bottom of the apron. The electric motor drive can comprise at least one electric motor and a gearing which is driven by it and which drives a drive cable which is connected to the cover via a pinion, the drive cable running through the apron in guide tubes into the vicinity of the pinion.

In other words, the invention calls for at least partial integration of the electric motor drive into the apron. As a result of this mounting site of the electric motor drive, compared to the previous approach with an arrangement of the electric motor drive between the apron and the cover, a clear view is obtained between the front edge of the cover and the rear edge of the apron, and the front edge of the cover can be located directly bordering the rear edge of the apron.

Money is clearly saved when, according to one development of the invention, the electric motor drive is accommodated completely in the cavity of the apron. To enable easy maintenance of the electric motor drive in this case, at least part of the bottom of the apron is provided with an opening which is closed by a cover, via which opening the electric motor drive is accessible from the outside.

In an embodiment of the invention in which the electric motor projects from the bottom of the apron, not quite the same amount of space is saved, as in the case of an electric motor drive located completely within the apron. However, in such a case, the motor can be easily maintained from the outside, because it is directly accessible.

In the following, the invention is explained in detail with reference to the embodiments shown in the accompanying drawings by way of example.

DETAILED DESCRIPTION OF THE INVENTION

Figure 1:
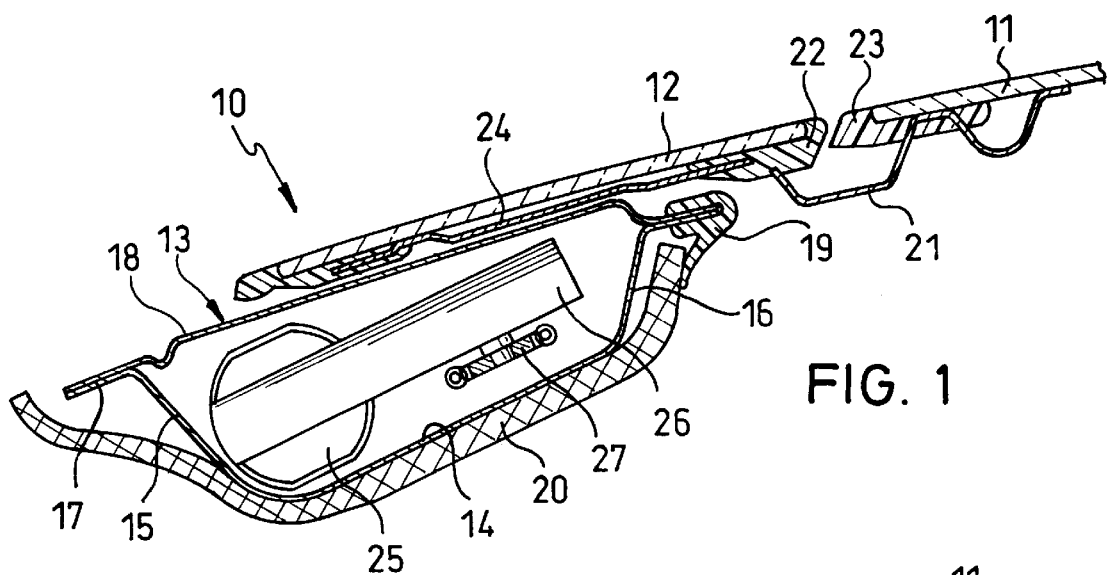
FIG. 1 shows a lengthwise section through the front part of the roof module as claimed in the invention.
Figure 2:
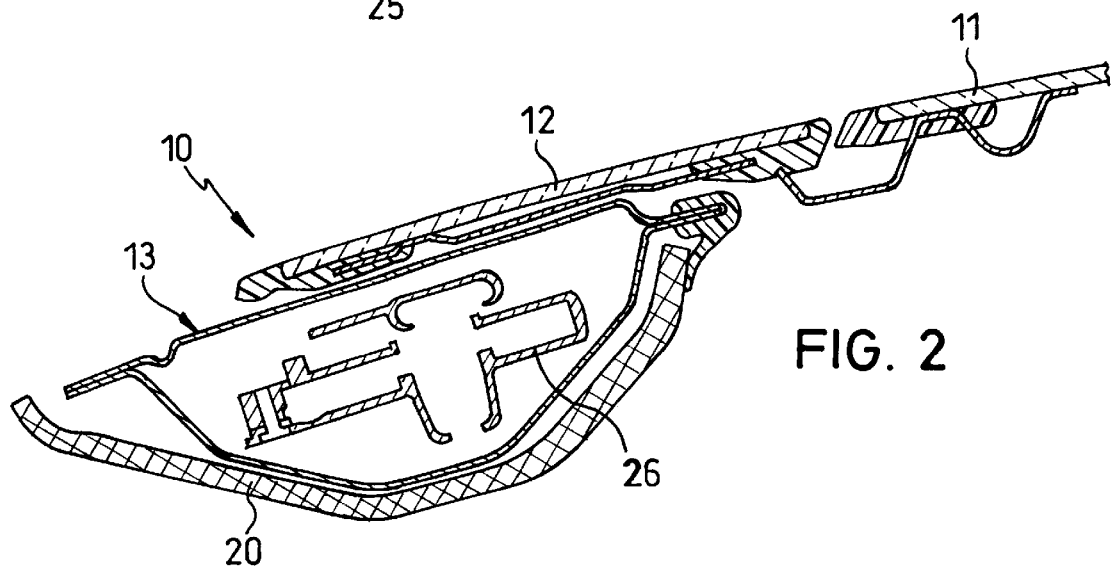
FIG. 2 is a view similar to that of FIG. 1, but offset laterally relative to it.

A first embodiment of the roof module is explained using FIGS. 1 and 2 and is a roof module of the type disclosed in European Patent Application EP 1048 553 which was incorporated by reference above. Roof module 10 for attachment to a roof frame area of a motor vehicle body comprises at least one cover 11 for selectively closing and exposing a roof opening in the roof module and an electric motor drive for actuating the cover. In the front area of the motor vehicle roof module, there is a front apron 13 which is a hollow section component of a mounting frame of the roof module, and like that of roof module of the incorporated European Patent Application, in an installed condition of the module in the motor vehicle body, front apron 13 forms a frontmost crossbeam of the roof frame area of the motor vehicle. A wind deflector 12, which is located in front of the closed cover 11, is in the form of a wind deflector louver which is pivotally mounted around a transverse axis in the area of its front edge so that it can be raised at its rear edge into an active position. The wind deflector 12 is located above apron 13. The apron 13 is formed of a trough-shaped base body with a bottom 14 which ascends from front to back, two front and back walls 15 and 16 which run obliquely upwards to the outside from the bottom, and left and right walls which are not shown because it is a cross section.

The walls 15, 16 end in a peripheral common flange edge 17, and the top of the trough-shaped apron 13 is covered by a plate-shaped cover 18, the edge of which is joined with the flange edge 17, especially welded thereto. The rear section of the flange edge 17 is surrounded by a lip seal 19, the lip of which projects downward, and adjoins the outside of the headliner part 20 which, following the shape of the outside contour of the apron 13, mainly, at least partially adjoins the bottom 14 of apron 13 and ends with its front edge at the height of the front section of the flange edge 17 of the apron 13.

The cover 11 is extrusion coated with a plastic edge 23 and the wind deflector 12 is extrusion coated with a plastic edge 22. On the bottom of the wind deflector 12 is a reinforcing frame 24 which is integrated into its plastic edge 22. There is a similar reinforcing frame 21 for the cover 11. The reinforcing frame 21 projects beyond the front edge of the cover 11, forms a gutter which runs transversely relative to a front-rear direction of the roof module 10 and which extends under the gap between the rear edge of the wind deflector 12 and the front edge of the cover 11 and its free end is used as a support for the wind deflector 12 when it is in its inactive position and for sealing against this plastic edge 22, as follows from FIGS. 1 & 2.

To drive the cover 11, an electric motor drive is used which comprises an electric motor 25 and gearing 26 which is connected to its drive shaft and which drives a pinion 27. The pinion 27 engages drive cables for driving the cover 11. The drive cables are guided in guide tubes which penetrate the trough-shaped apron 13 in the outer regions in the area of its wall 16. As shown in FIGS. 1 & 2, this electric motor drive is integrated fully within the cavity of the apron 13.

Figure 3:
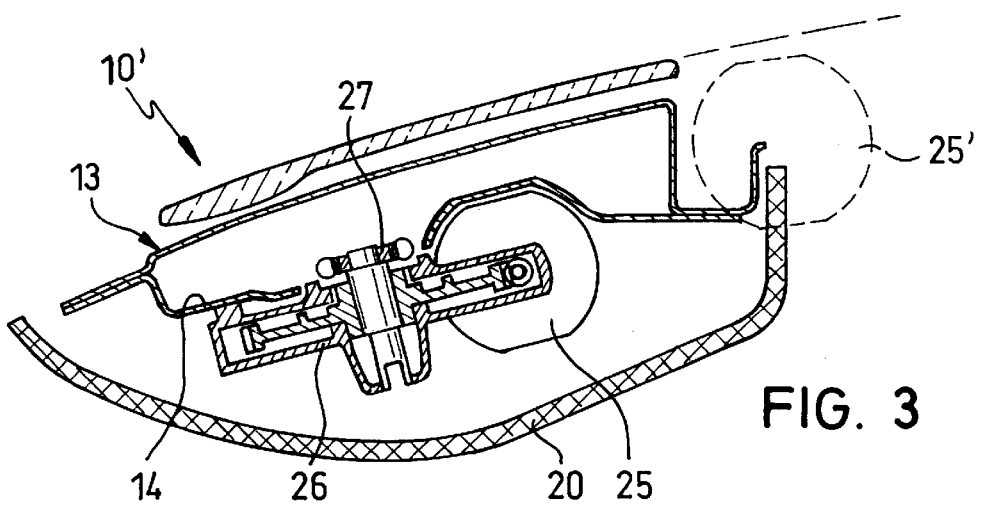
FIG. 3 shows a lengthwise sectional view of the front part of another embodiment of the roof module in accordance with the invention.

The arrangement of the electric motor drive 25, 26 inside the apron 13 saves mounting space which conventionally must be made available between the rear edge of the apron 13 and the front edge of the cover 11, as shown schematically by the broken lines FIG. 3, in which the electric motor located outside of the wind deflector according to the prior art is labeled 25'. Aside from the fact that mounting space is saved, in this way, it becomes possible to have an unobstructed view through the roof opening all of the way to adjacent the rear edge of the apron 13. Furthermore, the cover 11 can be located with its front edge 23 much farther forward than was necessary in the prior art.

FIG. 3 shows another embodiment of the roof module 10' in accordance with the invention. The same reference numbers are used in FIG. 3 for the same parts as in FIG. 1. In contrast to the embodiment shown in FIGS. 1 & 2, in the embodiment shown in FIG. 3, the electric motor drive is not integrated completely in the cavity of the apron 13, but simply held partially in it. Specifically, the upper part of the gearing 26 which part bears the pinion 27 extends into the interior of the apron 13, while the drive otherwise comes to rest on the lower side of the bottom 14 of the apron 13 and is attached there to the bottom 14, which has been inwardly recess to partially encompass the electric motor 25 is held thereby.

The embodiment shown in FIG. 3 has the advantage that repairs to the electric motor or gearing can be made without difficulty, since these two assemblies are accessible from the outside after removing the head liner part 20. To be able to make a similar repair in the embodiment as shown in FIGS. 1 & 2, the bottom 14 of the apron 13 must be made at least partially removable so that access to the electric motor and gearing assemblies is possible after the headliner part 20 is removed.

While various embodiments in accordance with the present invention have been shown and described, it is understood that the invention is not limited thereto. These embodiments may be changed, modified and further applied by those skilled in the art without departing from the above teachings. Therefore, this invention is not limited to the details shown and described previously, but also includes all such changes and modifications which are encompassed by the appended claims.

What is claimed is:

1. Motor vehicle roof module for attachment to a roof frame area of a motor vehicle body, comprising:
    at least one cover for selectively closing and exposing a roof opening in the roof module;
    an electric motor drive for displacing the cover; and
    a front apron which, in an installed condition in the motor vehicle body, forms a frontmost crossbeam of the roof frame area of the motor vehicle, and being a hollow profile component of a mounting frame of the roof module;
    wherein the electric motor drive is held at least partially within the front apron.

2. Roof module as claimed in claim 1, wherein the electric motor drive is held completely within in the apron.

3. Roof module as claimed in claim 1, wherein the electric motor drive is held partially within the front apron and projects partially on an underside of a bottom wall of the apron.

4. Roof module as claimed in claim 1, wherein the electric motor drive comprises at least one electric motor and a gearing which is driven by the motor, said gearing being drivingly connected via a pinion t o at least one drive cable which is connected to the cover.

5. Roof module as claimed in claim 4, wherein the at least one drive cable runs in a guide tube which runs backward through the apron from the vicinity of the pinion.

6. Roof module as claimed in claim 5, wherein the front edge of the roof opening is located proximate a rear edge of the apron.

7. Roof module as claimed in claim 6, wherein the electric motor drive is held completely within the apron.

8. Roof module as claimed in claim 7, wherein the electric motor drive is held partially within the front apron projects and partially on an underside of a bottom wall of the apron.

9. Roof module as claimed in claim 4, wherein the electric motor drive is held completely within in the apron.

10. Roof module as claimed in claim 4, wherein the electric motor drive is held partially within the front apron projects and partially on an underside of a bottom wall of the apron.

11. Roof module as claimed in claim 1, wherein the front edge of the roof opening extends to near a rear edge of the apron.

* * * * *